Feb. 7, 1928.

A. J. FLEITER ET AL 1,658,376

VULCANIZER

Filed Feb. 24, 1927    3 Sheets-Sheet 1

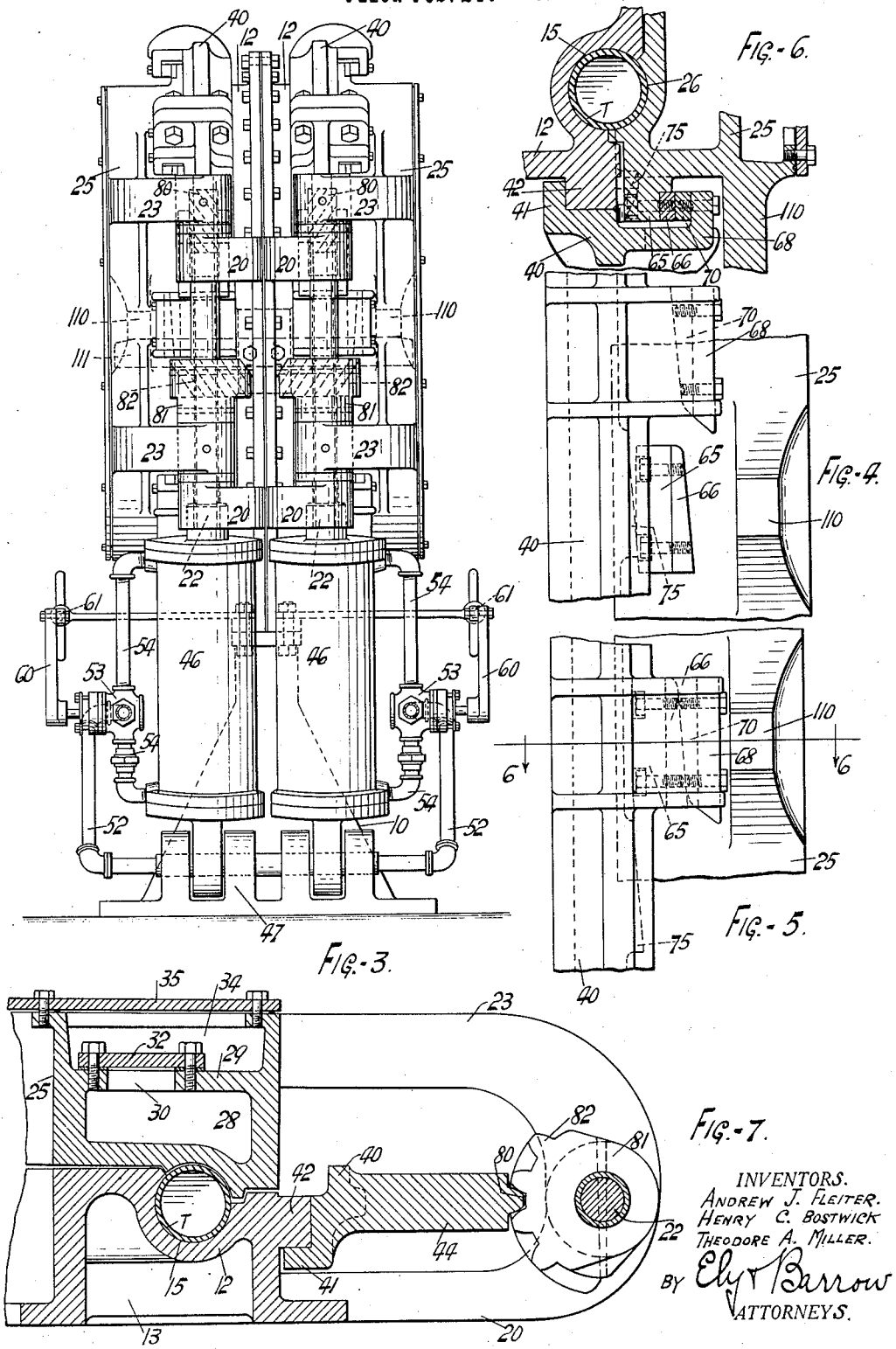

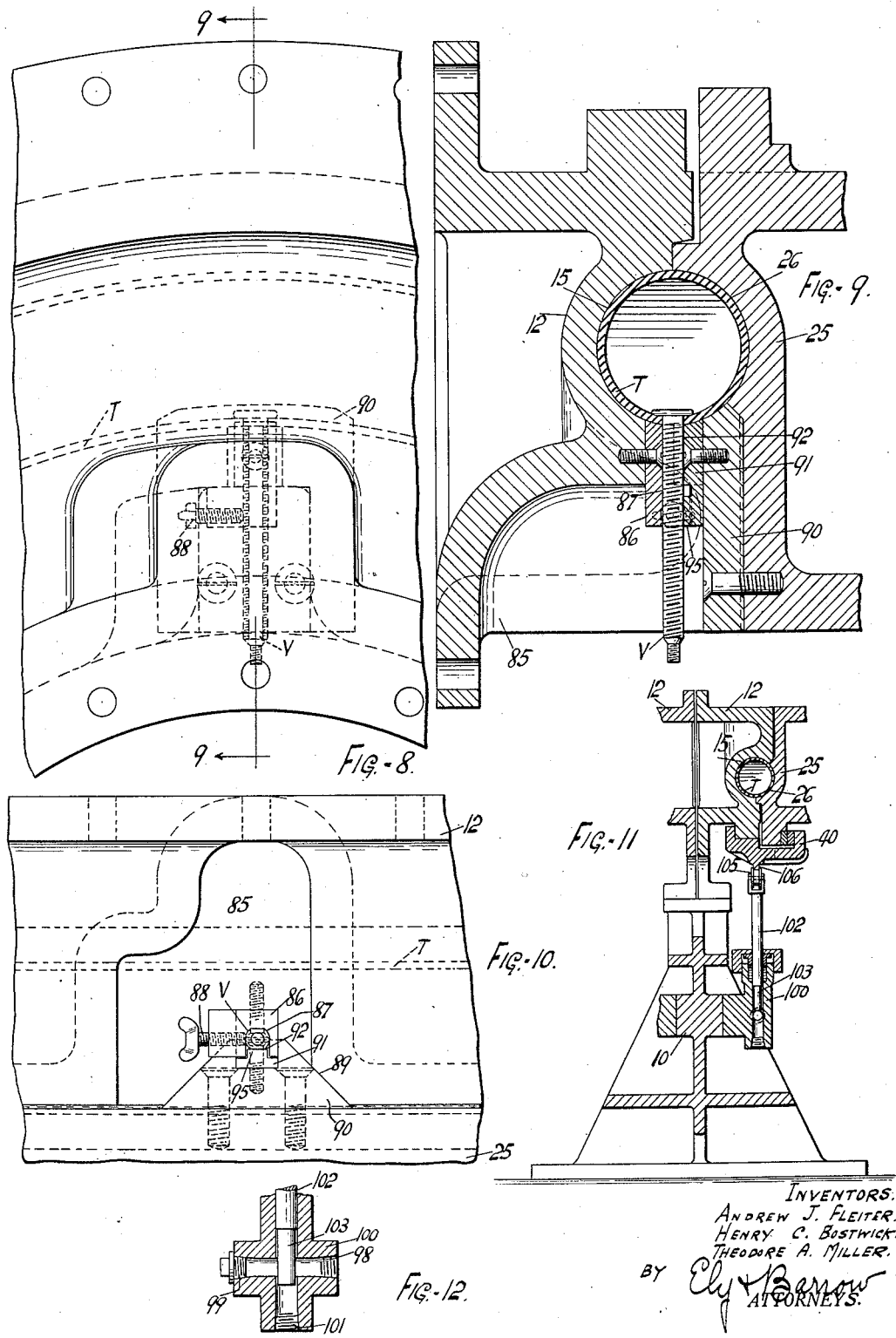

Patented Feb. 7, 1928.

1,658,376

UNITED STATES PATENT OFFICE.

ANDREW J. FLEITER, OF AKRON, HENRY C. BOSTWICK, OF KENMORE, AND THEODORE A. MILLER, OF AKRON, OHIO, ASSIGNORS TO THE AKRON STANDARD MOLD COMPANY, OF AKRON, OHIO, A CORPORATION OF OHIO.

VULCANIZER.

Application filed February 24, 1927. Serial No. 170,511.

This invention relates to new and useful improvements in vulcanizers, particularly of the type known as "watchcase vulcanizers" which are characterized by the fact that each vulcanizer comprises a central or stationary member on opposite sides of which are formed cavities for the vulcanization of tires, tubes, or the like, the cavities being closed by swinging or movable members which are brought into contact with the stationary member and locked in position. This form of vulcanizer is well known in the art, and while the particular embodiment of the invention is illustrated for use in the vulcanization of inner tubes, the vulcanizer may be constructed for the curing of tires or other articles as may be desirable. Features of the invention may be utilized in vulcanizers having a single swinging or movable section or halves, as well as in the double cavity type illustrated herein.

One of the objects of the invention is to improve upon the mechanism for opening the vulcanizer after the vulcanization is completed and closing the vulcanizer after an unvulcanized tire has been placed therein. Heretofore, vulcanizers of this type have been provided with a rotary locking ring mounted on one member of the vulcanizer, which ring is provided with cam-shaped locking formations engaging similar formations on the other vulcanizer member, and locking rings have also been provided with breaking formations which are for the purpose of breaking the adhesion between the mold sections and thereby starting the molds. In these vulcanizers, the ring has been provided with some means by which it could be rotated in one direction to lock and in the other direction to break and open the molds. With this form of device, however, the mold sections are merely started on the opening movement, and the operator is required to swing the heavy sections open to remove the cured tire or tube and replace with an unvulcanized article. The present invention has for its object the provision of means for swinging or moving the vulcanizer sections to the full extent required to gain access to the interior automatically and as a part of the functions of the apparatus. The device also closes the vulcanizer and locks it automatically. Particularly, the invention utilizes a continued movement of the locking ring to secure the full opening and closing of the vulcanizer, although the invention, in its broader aspects, may include other specific means of obtaining this result.

The details of the tube mold and particularly the means for accommodating the valve stem, which are shown and described herein, are made the subject matter of a divisional application Serial No. 202,843, filed July 1, 1927.

These and other objects of the invention will appear from the detailed description of the various features of the invention, as fully set forth herein, it being understood that such detailed description is for the purpose of explaining the invention to those skilled in the art and is not for the purpose of limitation to the scope thereof, except as required by the prior art and as set forth in the claims hereto appended.

In the drawings which accompany this application is shown one form of the invention, in which Figure 1 is a side view of a watchcase vulcanizer having the improvements incorporated therein;

Figure 3 is an end view of the vulcanizer;

Figure 4 is a detail of the vulcanizer after the initial breaking movement;

Figure 5 is a detail of the parts in locked position;

Figure 6 is a section on the line 6—6 of Figure 5;

Figure 7 is a detail of the mechanism for moving the movable mold section to full open position;

Figure 8 is an enlarged detail of the mold at the valve stem;

Figure 9 is a section on the line 9—9 of Figure 8;

Figure 10 is a view looking from below at the mechanism shown in Figure 8;

Figure 11 is a section on the line 11—11 of Figure 1; and

Figure 12 is a detail of parts shown in Figure 11 in another position.

Figure 1:
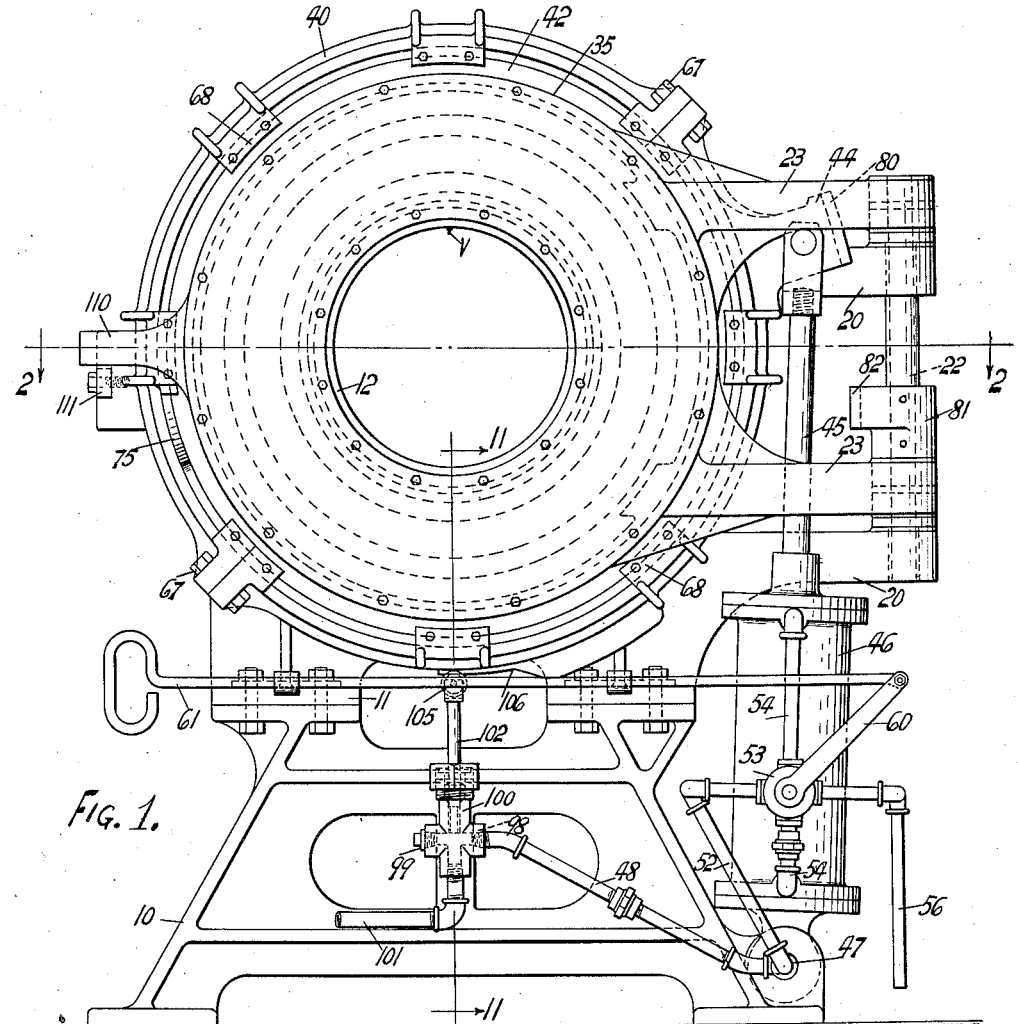
Figure 2:
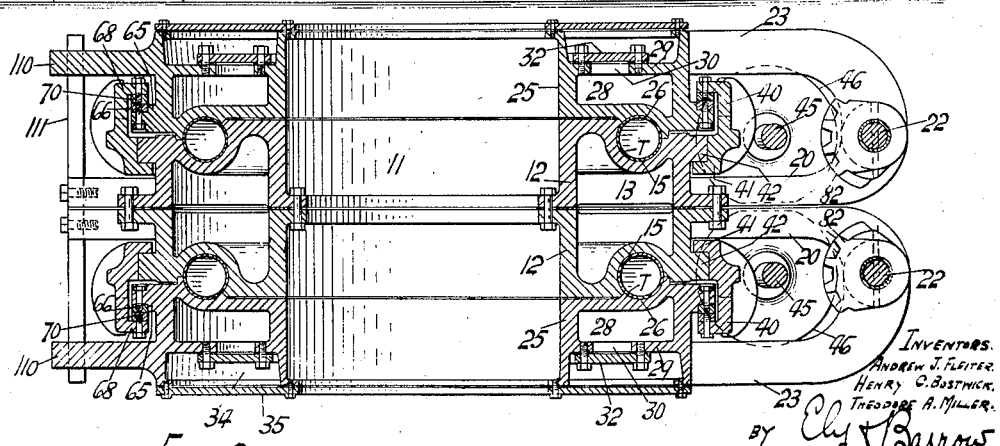
Figure 2 is a horizontal section on the line 2—2 of Figure 1, showing the device as equipped for the vulcanization of inner tubes.

The watchcase vulcanizer is mounted upon a standard or base 10, to the upper surface of which is secured the central or stationary member 11 which, as shown, comprises two castings 12 secured together so as to enclose a central steam chamber 13 which is heated by steam from any source. The outer faces of these castings are formed with cavities 15 which constitute one side of the vulcanizing chambers in which the articles are received. As shown in the present case, the cavity is designed for the reception and vulcanization of an inner tube T and comprises somewhat more than one-half of the transverse circumference of the inner tube.

Each casting 12 is formed with two parallel, aligned arms 20 and in the ends of the arms are mounted vertical hinge pins 22. Each hinge pin has secured to it outwardly extending arms 23 to the extremities of which is secured the movable or swinging section or door 25. Formed on the inner surface of each movable mold section is the cavity 26, which, with the cavity 15, completes the molding space. The sections 25 are provided with steam cavities 28 which are enclosed by intermediate walls 29. For the purpose of casting and inspection, the walls 29 may be provided with passageways 30 adapted to be closed by removable plates 32. In the outer portions of the swinging sections, chambers 34 are provided, closed by plates 35, these chambers being either dead air spaces or filled with any suitable insulating material, in either case conserving the heat in the vulcanizing cavities.

When the pair of mold sections is placed together, the sections are clamped in position by means of a locking ring 40 which is provided with an inturned flange 41 which engages over a rib 42 on each section 12. The ring is thus rotatably mounted and each ring is provided with a lug 44 to which is pivotally connected a piston 45 operated by a cylinder 46.

The cylinder 46 is pivotally mounted at the base of the machine at the point 47 formed in a lug projecting outwardly from the base 10 of the machine. The piston is moved in the cylinder by means of air or other fluid under compression which is admitted through a supply pipe 48 connected by a swivel joint located at the axis 47. From the joint a supply pipe 52 leads to a four-way valve 53 from which pipes 54 conduct the pressure fluid to either side of the piston. The pipes 54 also serve as exhaust pipes through the valve 53 communicating with the exhaust line 56. The valve 53 is controlled by a lever 60 and rod 61. When the pressure fluid is admitted to the cylinder, as stated, the clamping ring is rotated in either direction, depending upon whether the mold is to be locked or opened.

For clamping the halves of the mold together, each swinging or movable section is provided with a plurality of spaced lugs 65 which project outwardly from the sections, being provided on their outer faces with replaceable tapered wearing plates 66. The ring 40, which is in two sections secured together by bolts 67, is provided with outer overhanging, angular brackets 68, which are provided on their under surfaces with replaceable, tapering wearing plates 70 similar to the plates 66. When the mold is to be clamped together, the plates 66 and 70 are brought into engagement and the wedging surfaces force the movable section against the stationary section and securely clamp them in position.

When the vulcanizer is to be opened, the ring is rotated in the opposite direction and after the lugs 65 and the brackets 68 are out of alignment, a tapered lug 75 on the ring 40 strikes against the under side of one of the lugs 65 and the force exerted thereby will relieve the adhesion between the two sections and start or "crack" the vulcanizer so that it is opened slightly as is shown in Figure 7.

The device for fully opening the mold now becomes operative. In the apparatus as illustrated herein, the lug 44 is formed with a spiral gear segment 80 and to the hinge pin 22 is secured a second lug 81 formed on its outer face with a spiral gear segment 82 which lies in the path of the gear 80. As the movement of the ring is continued, the gear segments 80 and 82 engage at the end of the movement of the ring, these gear segments causing the rotation of the hinge pin 22 so as to swing the section 25 open to the full extent required to gain full access to the interior of the vulcanizer.

It is found that if the movable section or door is allowed to be moved by the full force of the pressure in the cylinder, it will open and close too rapidly after the mold is cracked and for this reason the movement of the door is retarded at the outer portion of its travel. This may be accomplished in any well known manner, the means shown herein comprising throttling of fluid pressure after the mold is cracked.

The supply pipe 48 for the fluid pressure is connected at its intake end to a control valve casing 100, preferably mounted on the base 10, the pressure being received in this casing from a main line 101. Mounted in the valve casing and movable over the outlet 98 is a plunger 102, the major portion of which fits the interior of the valve above the outlet, but the end of which is reduced slightly as at 103. The pressure being directed against the end of the plunger exerts a constant tendency to elevate it past the outlet. Outlet 99 opposite outlet 98 is closed by a plug, this arrangement permitting the similar valve casings to be mounted upon opposite sides of the vulcanizer.

The upper end of the plunger 102 is provided with a flanged roller 105 which is forced by the fluid pressure against a cam plate 106 cast on the locking ring 40. It will be observed that the cam plate 106 is formed with a low and a high portion. When the door is started or is being brought to its clamped position, the roller rides upon the low portion of the cam and the pressure fluid exerts its maximum effort upon the locking ring. When, however, the door is being swung open by the gears 80 and 82, the plunger is forced downwardly to the position shown in Figure 12 and the flow is reduced by the restricted end of the plunger so that the movement of the plunger is retarded.

The vulcanizer, as shown, is designed for the purpose of curing tubes, it being desirable to provide for the accommodation of tubes of different sizes or shapes in a single vulcanizer. For this purpose, the section 12 is provided with a recess or chamber 85 at one point about its periphery and to the wall of the section is replaceably secured a plate 86 which is formed on its face with a semicircular recess 87 for the passage of the valve stem V. The lower end of the plate 86 is enlarged somewhat, and at this point is provided with a thumb screw 88 by which the valve stem is clamped in position as may be desirable during the vulcanizing operation. When a stem of a different diameter is to be accommodated, the plate may be changed as required. The lower portion of the mold is cut away upon a generally V-shaped cut so as to obtain access to the tube, as shown at 89, and the space thus left open is closed by a correspondingly shaped block 90 secured to the movable vulcanizer section. The inner edge of the block 90 has secured to it a replaceable plate 91, which is provided with a complementary passageway 92 which, with the passageway 87, encloses the valve stem. The lower end of the plate 91 is provided with a tongue 95 which enters the recess in the lower portion of the plate 86.

To relieve the hinges of the weight of the swinging sections or doors and to thereby secure accurate registry of the mold sections, each swinging section is formed with a lug or arm 110, which is designed to ride upon the upper inclined surface of a bracket 111 attached to the stationary section and projecting outwardly beyond the swinging sections. As the mold sections close, they are guided into correct position by means of this device.

It will be observed that the description of the invention has been set out with considerable detail, but changes and modifications may be made therein without departing from the scope of the invention as set forth in the claims. Among the modifications which may be employed is the provision of replaceable mold sections attached to each member of the vulcanizer, as is well understood in this art.

What is claimed is:

1. A vulcanizer of the type described having a stationary section and a movable section, a clamping ring surrounding one of the sections, clamping lugs upon the ring, corresponding lugs upon the other section, means to rotate the ring to force the lugs together, a breaking lug also mounted upon the ring, and means operable in timed relation thereto to cause a further movement of the said movable section after the operation of the breaking lug.

2. A vulcanizer of the type described having a stationary section and a swinging section, a ring mounted upon one of the sections, clamping lugs upon the ring, corresponding lugs upon the other section, means to rotate the ring in one direction to force the lugs together, a mold breaking formation upon the ring and operative to crack the mold, and mechanism operable upon continued movement of the ring to cause a further extended movement of the swinging section.

3. A vulcanizer of the type described having a stationary section and a swinging section, a rotatable locking ring mounted upon one of the sections, means to rotate the ring, and mechanism operable upon movement of the ring to swing the section outwardly to permit access to the interior thereof.

4. A vulcanizer of the type described having a stationary section and a swinging section, a rotatable locking ring upon the stationary section, means to rotate the ring, a lug carried by the ring, and means engageable by the lug to swing the section outwardly on rotation of the locking ring to a sufficient extent to permit removal of the contents of the vulcanizer.

5. A vulcanizer of the type described having a stationary section, a hinge pin, a movable section carried upon the hinge pin, a lug upon the hinge pin, a rotary locking ring upon the stationary section, and a lug upon the ring, the said lugs contacting upon rotation of the ring to rotate the hinge pin and the movable section.

6. A vulcanizer of the type set forth having a stationary section and a swinging section, a locking ring rotatable upon the stationary section, a lug on the ring, a lug connected to the swinging section, and mating gear teeth upon the said lugs engageable by rotation of the locking ring.

7. A vulcanizer of the type set forth having a stationary section and a movable section, a locking ring rotatable upon one of the sections, the locking ring being adapted to move the other section at the termination of its movement in one direction to a sufficient extent to permit removal of the contents of the vulcanizer.

8. A vulcanizer comprising two sections, one of which is movable relative to the other, a rotatable locking ring upon one of the sections, and a formation upon the other section in the path of the ring and movable thereby to open the sections to a sufficient extent to permit removal of the contents of the vulcanizer.

9. A vulcanizer comprising a stationary section and a movable section and a single locking ring on one of the sections and movable in opposite directions, locking means on the ring operable to clamp the sections when the ring is moved in one direction, and means upon the ring when moved in the other direction to crack the mold and upon further movement to move the other section to its full extent.

10. A vulcanizer comprising a stationary section and a swinging section, a locking ring upon the stationary section rotatable in opposite directions, locking means to clamp the sections when the ring is moved in one direction, and mold cracking and opening means also mounted upon the ring and operable when the ring is moved in the opposite direction, first to start the swinging section and then to move it to its full extent.

11. A vulcanizer comprising two sections, one of which is movable to open and close the vulcanizer, a locking ring on one of the sections having cam formations adapted to engage cam formations on the other section to lock the sections together, a secondary cam formation on the ring operable to break the adhesion between the sections, and additional means operated by the locking ring to move the movable section to full open position.

12. A vulcanizer comprising two sections, one of which is movable to open and close the vulcanizer, a locking ring on one of the sections having cam formations adapted to engage cam formations on the other section to lock the sections together, a secondary cam formation on the ring operable to break the adhesion between the sections, and secondary mechanism operable in timed relation to the secondary cam formation to move the movable section to the full extent of its movement after the adhesion is broken by the cam formation.

13. A vulcanizer comprising two sections, one of which is movable to open and close the vulcanizer, a rotatable ring upon one of the sections having locking devices cooperating with the other section, a pressure cylinder, connections between the cylinder and the ring, and means for varying the amount of pressure within the cylinder during a portion of its operation.

14. A vulcanizer comprising two sections, one of which is movable to open and close the vulcanizer, a rotatable ring upon one of the sections having locking devices cooperating with the other section, and means to rotate the ring at varying rates of speed.

15. A vulcanizer comprising two sections, one of which is movable to open and close the vulcanizer, a rotatable ring upon one of the sections having locking devices cooperating with the other section, means to rotate the ring at fast and slow speeds, and connections between the ring and the movable section operative only during the slow movement of the ring.

16. A vulcanizer comprising two sections, one of which is movable to open and close the vulcanizer, a ring rotatable about one of the sections and having locking devices cooperating with the other section, means to rotate the ring at fast and slow speeds, a cam device on the ring to break the adhesion between the sections while the ring is moving rapidly, and mechanical connections between the ring and the movable section operable while the ring is moving slowly.

17. A vulcanizer comprising two sections, one of which is movable to open and close the vulcanizer, a ring rotatable about one of the sections and having locking devices cooperating with the other section, a breaking cam upon the ring operable upon its initial movement to break adhesion between the sections, and interrupted mechanical connections operative upon continued movement of the ring to move the movable section to its open position.

18. A vulcanizer comprising two sections, one of which is movable to open and close the vulcanizer, a ring rotatable about one of the sections and having locking devices cooperating with the other section, a breaking cam upon the ring operable upon its initial movement to break the adhesion between the sections, interrupted mechanical connections operative upon continued movement of the ring to move the movable section to its open position, and means to vary the speed of rotation of the ring between the operation of the two devices.

19. In a vulcanizer, the combination of two sections movable relative to one another, a locking device for holding the sections together during vulcanization, a breaking device for breaking the adhesion between the sections, additional means for fully moving the sections apart to permit access to the interior of the vulcanizer, and an actuating device for causing unlocking of the mold, the breaking of the adhesion and the full opening of the mold in sequence.

ANDREW J. FLEITER.
HENRY C. BOSTWICK.
THEODORE A. MILLER.